Dec. 9, 1969   A. V. C. DAVIS   3,482,732
FRANGIBLE SAFETY MEANS FOR RELIEVING EXCESS FLUID PRESSURE
Filed Oct. 19, 1967   3 Sheets-Sheet 1
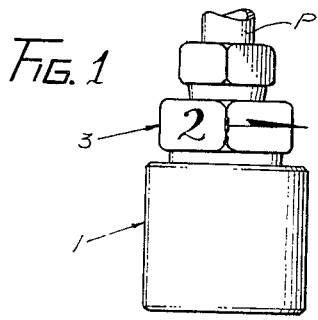
FIG. 1
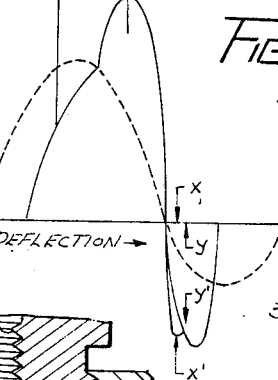
FIG. 5
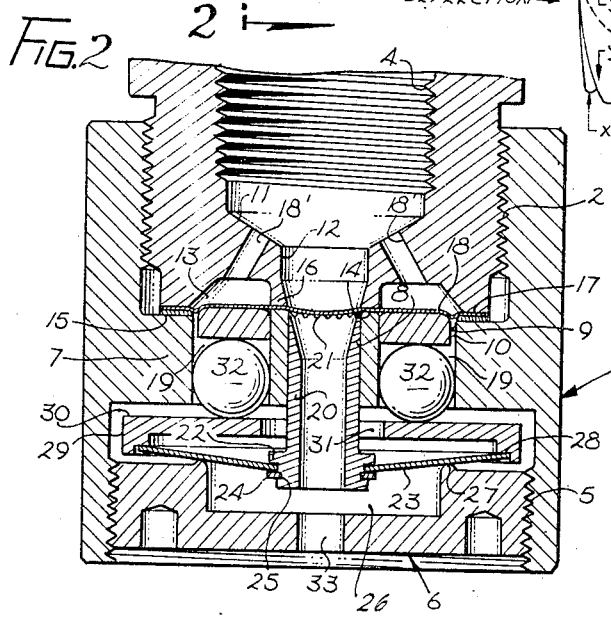
FIG. 2
FIG. 3
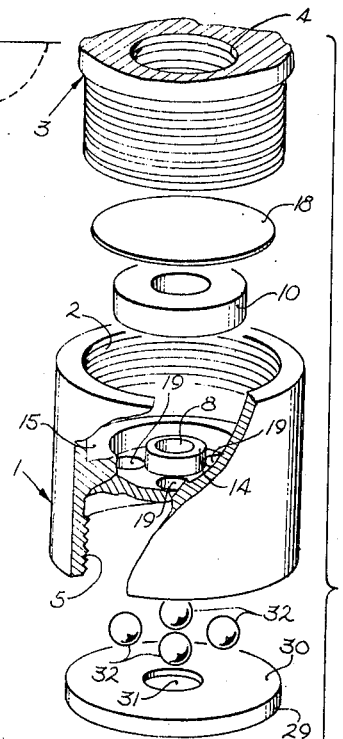
FIG. 4
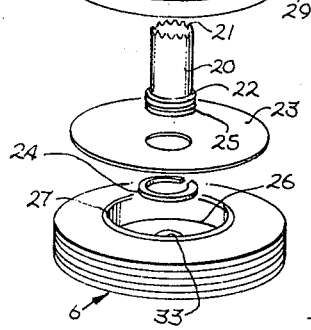
ALLEN V. C. DAVIS
INVENTOR.
BY *Perry E. Turner*
ATTORNEY

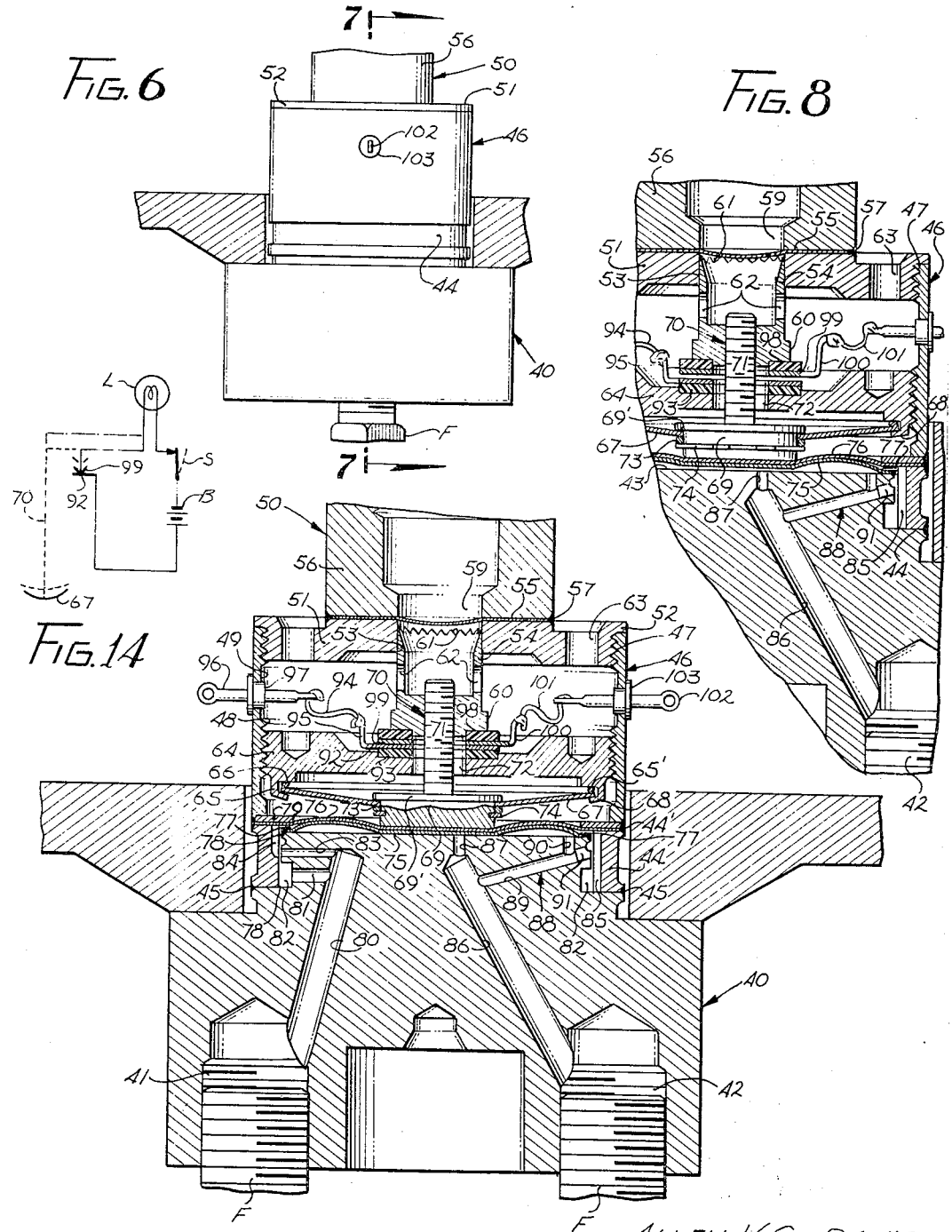

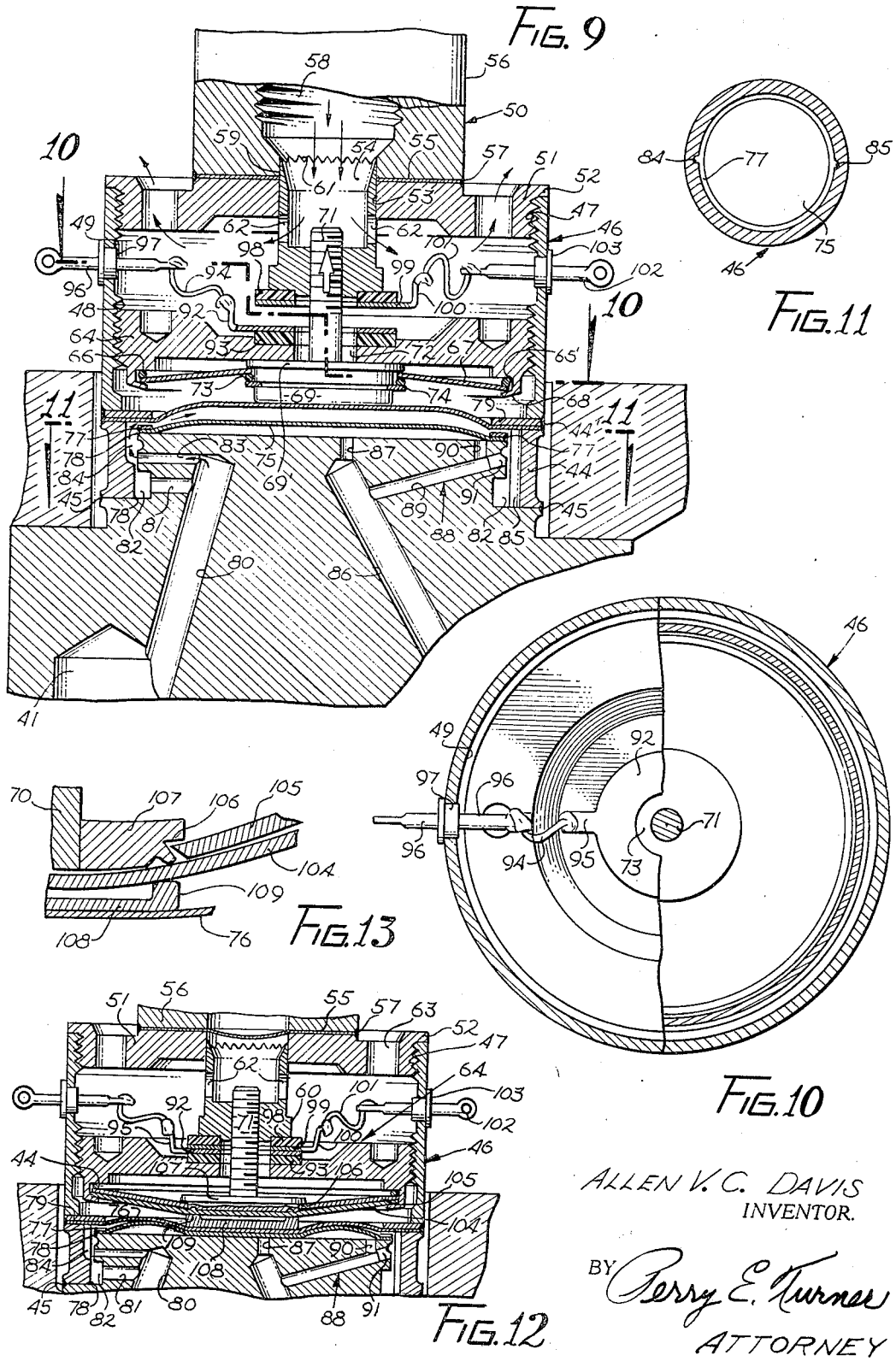

United States Patent Office 3,482,732
Patented Dec. 9, 1969

3,482,732
FRANGIBLE SAFETY MEANS FOR RELIEVING EXCESS FLUID PRESSURE
Allen V. C. Davis, 5600 Alta Canyada, La Canada, Calif. 91011
Filed Oct. 19, 1967, Ser. No. 676,568
Int. Cl. B65d 47/36
U.S. Cl. 220—89        8 Claims

ABSTRACT OF THE DISCLOSURE

A safety device for fluid pressure systems includes a rupturable diaphragm subject to system pressure and a knife normally held retracted from the diaphragm via a snap disc spring. In response to a pressure of predetermined magnitude, the spring propels the knife to rupture the diaphragm and release the pressure. Means are disclosed for testing the apparatus without permitting the knife to rupture the diaphragm.

BACKGROUND OF THE INVENTION

Field of the invention

The invention relates to devices including a frangible member operative upon rupture thereof to relieve an excess fluid pressure condition.

Description of the prior art

So far as is known to applicant, the closest prior art devices are those such as disclosed in Patent Nos. 3,155,-271 and 2,977,020 in which the frangible member is moved by the imposed pressure into engagement with a rupturing component. There is no device known to applicant which uses a controllable, resettable spring of the Belleville type which functions in accordance with his invention. Similarly, there is no means known to applicant for testing such a device without causing rupture of the diaphragm.

SUMMARY OF THE INVENTION

In this invention, a diaphragm is supported between a source of fluid pressure and a passage that communicates with the atmosphere. Next to one surface of the diaphragm is a diaphragm-rupturing device which includes an initially set spring means that is operated by a pressure of predetermined magnitude to cause the device to rupture the diaphragm and release the pressure.

My invention provides a unique safety device in which spring means includes a spring to be cocked from a normal position, and which by reason of the stored power is endowed with sufficient power to cause the knife means to rupture the diaphragm with incident release of the pressure as an incident to the return of the spring to its normal condition of repose. The device is capable of being tested from time to time while in use, to insure that the device is capable of actuation when and if it is subjected to the pressure for which it is designed to respond. Moreover, the spring is capable of being selectively adjusted, and can be reset for repeated uses.

With the foregoing objects in view, together with such additional objects and advantages as may subsequently appear, the invention resides in the parts and in the construction, combination and arrangement of parts disclosed, by way of example, in the attached drawings showing certain presently preferred embodiments of the invention.

BRIEF DESCRIPTION OF THE DRAWINGS

In the drawings:

FIG. 1 is a side elevational view of a device constituting a first embodiment of the invention;

FIG. 2 is an enlarged medial view as taken on the line 2—2 of FIG. 1 showing the device in position of use and resisting pressure;

FIG. 3 is a sectional view similar to FIG. 2 but showing the condition of the device after having gone through a diaphragm rupturing actuation;

FIG. 4 is an exploded perspective view of the principal component parts of the said first embodiment, one of said parts being partially broken away to disclose interior configuration;

FIG. 5 is a load-deflection graph of a typical spring means such as shown in the preceding figures;

FIG. 6 is a side elevational view of a second embodiment of the invention;

FIG. 7 is an enlarged scale transverse sectional view as taken on the line 7—7 of FIG. 6 and showing the device in its normal position of use;

FIG. 8 is a fragmentary view generally similar to FIG. 7 but showing the use of the device incident to a testing procedure thereof;

FIG. 9 is a further enlarged view generally similar to FIG. 7 but showing the device in the position in which it has executed a diaphragm rupturing operation;

FIG. 10 is a transverse sectional view taken on the staggered line 10—10 of FIG. 9;

FIG. 11 is a reduced scale, transverse sectional plan view taken on the line 11—11 of FIG. 9;

FIG. 12 is a fragmentary sectional view taken in the same plan as FIGS. 7, 8 and 9 showing a modified form of the second embodiment of the invention;

FIG. 13 is a greatly enlarged view of the portion of FIG. 12 indicated by the circle indicated by the numeral 13 in FIG. 12; and FIG. 14 is a circuit diagram illustrating schematically the testing procedure employed with the second embodiment of the invention.

DESCRIPTION OF THE PRESENTLY PREFERRED EMBODIMENTS

Referring to the drawings and particularly to FIGS. 1 through 5, the first embodiment of the invention includes a cylindrical body 1 that is tapped at 2, and in which a connector 3 is threaded. The outer end of the connector is tapped at 4 to receive a pipe connection P to a source of system fluid pressure. The opposite end of the body 1 is tapped at 5 to receive a threaded plug 6.

The coaxially tapped portions 2 and 5 of the body 1 are separated by a transverse wall portion or web 7 having a central knife guiding bore 8 extending therethrough. The upper face of the wall portion 7 is provided with an annular groove 9 in which a diaphragm supporting ring 10 is loosely disposed.

The inner end of the connector 3 has a tapered opening 11 that extends between the tapped portion 4, and a bore 12 that is aligned with the bore 8 in the wall 7. The end face of the connector 3 adjacent the wall 7 is provided with an annular groove 13 which confronts the groove 9. Because of the groove 9, the upper face of the wall 7 has concentric lands 14 and 15. Similarly, because of the groove 13, the adjacent end face of the connector 3 has concentric lands 16 and 17 opposing the corresponding lands 14 and 15.

A flexible diaphragm is clamped near its periphery between the lands 15, 17, and is clamped between the lands 14 and 16 near its center. As will be noted, the center portion of the diaphragm is not backed up, and constitutes a wall of the cavity on the interior of said body which is subject to system pressure. Passages 18, 18' extend between the bore 4 and the groove 13, whereby fluid pressure is applied to the surface of the diaphragm between the inner and outer lands, as well as on the center portion of the diaphragm below the bore 12. The lower surface of the portion of the diaphragm extending between the lands 14 and 14 is supported by the upper face of the ring 10.

In the bottom of the groove 9, the wall 7 is provided with a plurality of spaced holes 19. Preferably, the thickness of this portion of the wall portion is substantially less than the diameter of one of the holes 19.

Slidably mounted in the bore 8 is a tubular knife 20 having a serrated cutting edge 21 at its upper end. The knife 20 is normally retracted from contact with the diaphragm. Adjacent its lower end, and below the bore 8, the knife is provided with an annular rib 22, the lower part of which is engaged by the inner portion of a Belleville spring 23. The spring 23 is loosely retained on the knife by a spring washer 24 that is seated in a groove 25 in the knife.

The plug 6 at its inner face is provided with a coaxial recess 26 into which the lower end of the knife 20 extends. The transition between this recess and the inner face of the plug provides an annular fulcrum shoulder 27 on which the Belleville spring rests between its inner and outer edges. The outer edge of the spring registers against a shoulder 28 formed in the edge of an annular flange 29 of a heavy washer element 30.

Loosely disposed in the holes 19 in the wall 7 are respective balls 32. In this example, the diameter of such a ball is substantially greater than the thickness of the portion of the wall 7 in which the holes 19 are formed. As will be seen, the balls serve as thrust transmitting means between the washer 30 and the ring 10.

The Belleville spring has an $h/t$ ratio within the range of about 2.75–3.50 which imparts to it the capacity to be self-sustaining when moved past a center position from its position of normal repose. This then requires that force be applied to move it from that position to a point at which its stored energy will return it to its said normal position. In FIG. 5 the dotted line represents a typical force-deflection of a Belleville spring having such an $h/t$ ratio incident to being able to be moved to its over center, self-sustaining or "cocked" position. In this curve, reading from left to right, the upward slope represents an increasing force resistance with deflection to move the spring to an approximately flat peaked position, the flattening of the curve representing no increase in force required to move it to and over its flat position, the downward slope representing the reduced force with depletion as the spring moves to its over center position, and the final downward extremity representing the force exerted by the spring to remain in its over center position and representing conversely the force which must be exerted on the spring to effect its return or "reactuation" movement.

The solid line is read from right to left and represents the resisting forces involved in the return movement of the spring as amplified by the interposed fulcrum 27. The system pressure necessary to overcome said resisting force is obviously determined by the area of ring 10 exposed to the system pressure through the overlain diaphragm.

The disc spring is retained such that a force magnitude represented by $y-y'$ is resisting the system pressure through ring 10 as just described. However, upon initial movement of the spring from its position in FIG. 2, a positive spring rate precedes the negative rate. Accordingly, it is necessary to apply a sustaining system pressure sufficient to overcome force $x-x'$ and cause a snap deflection which results in releasing the work represented by the area above the abscissa of the curve as the disc spring reverts to its normal uncocked position. On deflecting to this said normal position, the force magnitude follows the curve described by the solid line due to its amplification by the fulcrum 27.

The work thus released is applied through the knife 20 to effect both rupture and shearing of the pressure releasing diaphragm. The disc spring provides the required high initial rupture force through its pivotal action about the fulcrum. The follow-through shearing action is effected as the spring disengages the fulcrum and deflects at its outer periphery. The range over which the system pressure assists this rupture shear action depends upon the travel permitted by ring 10 before coming to rest against its stop face and may vary from no force assistance to full force assistance equivalent in magnitude to $x-x'$.

In FIG. 2, the spring is shown in its "cocked" position, in which it is holding the knife retracted downwardly from engagement with the diaphragm. Since the spring is resting on the fulcrum shoulder 27, the outer edge of the spring is holding the washer 30 elevated. As a result, the balls 32 are holding the ring 10 lifted clear of the bottom of the groove 9, consequently lifting the portion of the diaphragm engaged thereby above the plane defined by the lands by which the diaphragm is clamped. Preferably, to prevent unintended rupturing of the diaphragm by these lands or by the ring 10, the corners of the lands bounding the groove 9 and the corresponding corners of the ring 10 are rounded.

As fluid pressure is built up in the system represented by the line P, and is applied to the surface area of the diaphragm opposed by the ring 10, any pressure sufficient to displace the ring, and hence the balls 32 and washer 30, to a point at which the spring snaps to its position of normal repose, causes the spring to assume the position shown in FIG. 3. Thus, the knife is propelled to puncture and shear the diaphragm, thereby to release the pressure, e.g., through a central bore 33 in the end plug 6. In this example, the sheared portion of the diaphragm is blown through the plug to the exterior of the body 1.

To replace a ruptured diaphragm, the body 1 is unscrewed from the connector member 3; the knife pushed back until the Belleville spring is again cocked; a new diaphragm is inserted in plae of the ruptured diaphragm; and the body is screwed back onto the connector.

The device may be adapted for response to various pressure conditions by such well known expedients as varying the $h/t$ ratios of the springs, by exerting the inner and outer diameters of the spring, by stacking a plurality of springs, or by varying the diameter of the fulcrum shoulder 27 with resultant change in the leverage characteristics of the spring or by any combination of such expedients. Additionally, the sensitivity of or the force exerted by the Belleville spring may be varied by the addition of other spring means formed integrally therewith as taught by my prior Patent 3,030,096, dated Apr. 27, 1962, or by added modifying springs as taught by my prior Patents 2,824,919, dated Feb. 25, 1958, or 3,056,004, dated Sept. 25, 1962, or by any combination of such modifying means.

Referring next to FIGS. 6–13, there are shown two forms of a second preferred embodiment of the invention which is like the first embodiment in that an over center spring means actuates the diaphragm rupturing knife, but in which (a) means is provided for imposing test conditions while the device is in use to ascertain that the device is ready to operate at the intended pressure condition and (b) an independent pressure source of known and slightly less magnitude than the system pressure at which diaphragm rupture will be effected may be employed for test and calibration purposes.

The first illustrated example of the second preferred embodiment of the invention is shown in FIGS. 6–12 and comprises a body 40 provided with threaded ports 41 and 42 on one face (the lower end as seen in the drawings) affording separate connection by fittings F, F to a single or to different sources of pressure as will presently appear. The body 40 at its upper end is formed with a reduced diameter portion 43 which is surrounded by a short cylinder 44. The cylinder 44, which has an inner diameter larger than the diameter of portion 43, is hermetically sealed at its lower end to the body 40, e.g., as by brazing or welding at 45. Secured to the upper end of the cylinder 44, as by welding or brazing at 44', is a hollow cylindrical housing 46. The housing 46 is internally threaded at its upper end, at 47, and also at about its midlength at 48.

Threaded into the upper threaded portion 47 of the housing, and disposed in communication with the system pressure to be relieved, is a rupture diaphragm assembly 50. The assembly 50 includes a disc-like diaphragm support 51 and an annular flange portion 52 adapted to seat on the upper end of the housing 46. At its center, the support 51 has a bore 53 in which a tubular diaphragm rupturing knife 54 is slidable. The knife 54 (see FIG. 6) is normally retracted out of contact with the diaphragm 55 to be ruptured thereby. The diaphragm 55 is a thin metal plate overlying the bore 53. A tapped pressure connection element 56 rests on the diaphragm 55. The support, diaphragm and connector element are hermetically welded or brazed into one integral unit as at 57.

The connector unit includes a tapped bore 58 affording means of connection with the fluid pressure to be protected by the device. The lower, unthreaded portion 59 of the bore is adapted to slidably receive the knife 54 as it passes through the diaphragm 55 when the device is actuated.

The lower end 60 of the knife is closed, and the knife is provided with transverse openings 62 through which released pressure may escape to the interior of the body 46. The support 51 is provided with openings 63 through which such released pressure may escape to atmosphere. In the illustrated embodiment of the invention, in the event of actuation of the device, the entire unit 50 is discarded and replaced by a new unit having an unruptured diaphragm. If desired, the diaphragm may be made replaceable by an adaptation of the means therefor, disclosed in FIGS. 2 and 3.

Threaded into the middle portion 48 of the housing 46 is a disc-like support member 64 which at its lower surface has an annular flange 65 including a shoulder 65' against which a wire ring 66 is seated. Seated on the ring 66 is the peripheral edge of a Belleville spring 67 which is retained therein by spinning over the edge of the flange 65 as at 68. The spring 67 is of the same general character as the spring of FIGS. 2–4.

The center hole of the spring 67 receives the reduced diameter portion of the head 69 of a screw 70 which extends through a central opening 72 in the support member 64, and which threadedly engages the lower end 60 of the knife 54. The larger diameter 69' of the screw head affords a shoulder which engages the inner edge portion of the spring 67, which portion is retained on the head 69', as by a wire ring 73 around the head and a snap ring 74 seated in a groove in the head. Thus arranged, the screw can be rotated to adjust the axial position of the knife edge at a desired distance from the diaphragm as shown in FIG. 7. The wire rings 66 and 73 reduce frictional resistance to the actuation and reactuation of the Belleville spring, the term "reactuation" being the term commonly employed to designate the movement of any snap action spring to its position of repose.

As in the first disclosed form of the invention, the spring shown is a self-sustaining Belleville spring capable of being caused to move by snap action from its position of repose to an over center position in which it is self-sustaining. When, however, system pressure subjects the spring to a greater negative force than it sresistance to maintain in its over center or cocked position, it will move to its position of repose with snap action by reason of the energy stored therein. And as an incident to that movement, the spring will cause the knife 54 to rupture the diaphragm 55 with resultant release of the system pressure.

This negative force which is imposed on the Belleville spring is derived from a pressure responsive flexible diaphragm means which is subject to imposed pressure and which comprises a pair of diaphragms 75, 76. The diaphragm 75 overlies the upper end of the body 40 and is hermetically sealed thereto around its periphery with an overlying ring 77, as by brazing or welding at 78. As shown, the diaphragm 76 overlies the diaphragm 76. The peripheral edge of the diaphragm 76, together with an overlying metal ring 79, is disposed between the end faces of the cylinder 44 and the housing 46, and is hermetically sealed in that position, as by the welding or brazing at 44', which also hermetically seals the connection between the cylinder 44 and housing 46. As will presently appear, either or both diaphragms 75, 76 may be subject to system pressure.

Referring to the drawings, the annular space within the cylinder 44 affords an opening for the entrance of pressure fluid between the two diaphragms. To this end, the port 41 communicates with an upwardly extending passage, and the upper end of that passage is connected by a laterally extending passage 81 to a peripheral groove 82 in the reduced diameter portion 43 of the body 40. The passage 80 is further connected by a second laterally extending passage 83 to a groove 84 formed in the inner face of the cylinder 44. The groove 84 extends from the point of communication with the passage 83 to the upper end of the cylinder 44.

At a point diametrically opposite the groove 84, the inner face of the cylinder 44 is provided with a second groove 85 extending from end to end of the cylinder 44, and thus affording communication between the groove 82 and the space between the peripheral edges of the two diaphragms. Accordingly, fluid under pressure entering through port 41 is conducted between the diaphragms to seat the diaphragms 75 against the end of the upper end of the body 40, and to distend the diaphragm 76.

As previously mentioned, both diaphragms 75, 76 can be moved together. To this end, the port 42 connects with an upwardly extending pasage 86, from which a smaller passage 87 extends to the upper end of the body 40 at a point near its center. Additionally, a second passage 80 extends from the passage 86 to the upper end of the body 40 adjacent the periphery thereof. The passage 88 is shown to be formed by a lateral passage 89 and a vertical passage 90. The outer end of the lateral passage 89 is plugged at 91. Pressure fluid introduced through the port 42 will therefore act against the diaphragm 75. If such pressure is of sufficient magnitude, both diaphragms are moved together.

When the Belleville spring 67 is cocked as shown in FIG. 7, the limit of such movement is determined by the engagement of the screw head 69 with the diaphragm 76 pressing it against the diaphragm 75 and the latter into engagement with the upper end of the body 40. Preferably, the diaphragms have nesting circular convolutions near the outer movable portions thereof. This provides extra material to facilitate pressure-induced distension of the diaphragms with less structural stress on them.

With the spring 67 cocked, the cutting edge of the knife 54 is retracted out of contact with the diaphragm to be cut, the spacing being determined by adjustment of the knife along the screw threads 71. The pressure to initiate the reactuation of the spring is, of course, that which overcomes the force with which the cocked spring holds the screw head 69 against the undistended diaphragms 75 and 76. When sufficient pressure is applied to either of the ports 41 or 42, the diaphragm 76 is distended sufficiently to move the screw 69 and, consequently, the cocked spring to a point (see FIG. 5) at which it snaps to its position of normal repose. As in the previous example, the knife thus ruptures the diaphragm 75 with resultant release of system pressure to the atmosphere through the hollow knife, the passages 62, and the opening 63. When a replacement unit is put in the housing 46, the Belleville spring is recocked and ready to function in the same way again.

A safety device of this character is, of course, intended to operate only if a dangerous condition should develop.

Desirably, it can be tested from time to time to insure that it is ready to operate at the pressure at which it is intended to operate. To do this, one of the ports 41, 42 is connected to a test calibration pressure source—the other being connected to the system source (not shown). The procedure for conducting test calibration involves supplying pressure until a test circuit is disrupted whereupon further pressurization is discontinued with the pressure magnitude noted being the calibrated pressure. The test circuit includes a lamp or other indicator to aid the operator.

The test circuit includes a metal contact ring 92 that is carried on an insulating washer 93 secured to the upper surface of the support member 64. A flexible lead 94 connects an upstanding finger 95 of the ring 92 with one end of a terminal member 96 that is carried by an insulating bushing 97 secured in the wall of the housing 46 at a point between the threaded portions 47, 48.

Mounted on the lower end 60 of the knife is an insulating washer 98, which carries a second contact ring 99 on its lower surface. The contact 99 has a laterally extending finger 100 which is connected by a flexible lead 101 to a terminal 102 mounted in an insulating bushing 103 in the wall of the housing 46. When the spring is cocked, the contacts 92, 99 are in engagement so as to provide a direct electrical connection between the terminals 96, 102.

In assembly, the spring support member 64 is adjusted, as by a spanner wrench engaging sockets 64' therein, so that the screw head 69 bears against the portions of the undistended diaphragms 75 and 76 with a preload force. The preload is of such magnitude as to be overcome only by the imposition on the one of said diaphragms of the actuating pressure at which the device is to be caused to rupture diaphragm 55. When a test pressure is applied to the port employed for calibration, the other port being at less than relief initiating pressure, the spring displaces for a small increment sufficient to separate the contacts 92 and 99 with a resultant extinguishment of a signal light associated therewith or other appropriate signal, whereupon the test procedure is abruptly terminated to prevent diaphragm rupture during a calibration test. Such testing is carried out while keeping system pressure applied, i.e., maintaining system pressure does not affect the calibration test.

Referring to the signaling means, investigation has revealed that the force-deflection curves for a Belleville spring do not precisely follow the characteristic force-deflection curves for such springs shown in text material relating to Belleville springs during a small increment of initial travel in either direction. During this small increment before the entire spring has commenced to deflect, a positive spring rate is exhibited which, although infinitely small in comparison with the normal deflection, is suitable to provide a signal that normal operation is imminent without the normal operation having taken place. This is indicated on the portion of the curve between the points designated as "x" and "y" in FIG. 5. This is the movement which, without appreciable increase in the reactuation initiating pressure induced force, operates to effect a separation of the contact members 92 and 99. By so doing, an indication is obtained that the device is set to operate at the desired magnitude of pressure.

Mention has been made of auxiliary spring means for modifying or increasing the reacting force of the Belleville spring as taught by my prior patents. FIGS. 12 and 13 show still another modification, one not suggested by such prior art and comprising an imperforate disc spring 104 underlying the Belleville spring 105, which is generally similar to the spring 67 in FIGS. 7, 8 and 9. The disc 104 has overcenter characteristics similar to the Belleville spring and the peripheral edges of both springs are juxtaposed and secured in the supporting member 64 by the spun over flange 68 thereof. To maintain the Belleville spring 105 in close parallel alignment with the disc spring 104, it is engaged in a peripheral groove 106 in the modified head 107 of the screw 70 as best shown in enlarged scale in FIG. 13. If desired, a rigid disc 108 may be interposed between the disc spring 104 and the diaphragm 76, such disc 108 preferably having an annular flange portion 109 engaging the central portion of the disc spring 104 (or in those cases in which the pressure conditions are of a magnitude requiring a sufficiently rugged diaphragm 76, the disc spring 104 may directly engage the diaphragm 76).

FIG. 14 shows a circuit diagram such as might be employed in the test procedure above outlined for the second embodiment of the invention. The components of the invention with which this figure is concerned are identified by the same numbers as in the preceding figures, and other elements are identified by letters. The illustrated circuit includes an energy source B, a signal means (here shown as a lamp L) and a switch S by which the testing circuit may be rendered operative or inoperative.

When the Belleville spring is cocked and either or both diaphragms 75, 76 have not displaced the screw 70, the lamp L is illuminated upon closing the switch S. Upon the application of such pressure as will cause the screw 70 and the contact member 99 carried thereby to move away from the contact member 92, the circuit will be broken and the light extinguished. This occurs just short of diaphragm-rupturing pressure, and clearly indicates that the device is ready to operate at the pressure at which it is intended to rupture the diaphragm.

It will be apparent that my invention embraces other suitable indicator control means. Obviously the circuit may be set up so the lamp is normally off, but is illuminated upon the movement of the screw 70 at the desired test pressure. For this operation, the parts are arranged so the contacts are normally open, and they close in response to slight movement of the screw. Further, if desired, the operation of the lamp circuit may be utilized to lower the test pressure automatically, e.g., by electromechanically operating a valve that controls the application of test pressure.

I claim:

1. Safety apparatus for relieving a pressure condition in a fluid pressure system, comprising:
   a body having a cavity to be connected to the pressure in the system;
   a diaphragm forming a wall of said cavity;
   and means operative to rupture said diaphragm in the event of imposed pressure thereon in excess of a predetermined magnitude, said rupturing means including
      a knife element having a diaphragm rupturing edge;
      an overcenter spring means coupled to said knife, said spring means being cocked from a normal position and remaining cocked until released by sufficient pressure, said knife in the cocked condition of said spring means having its rupturing edge adjacent to said diaphragm;
      an element physically contacting the periphery of said spring means;
      and means for releasing said spring means from its cocked condition at a pressure of said predetermined magnitude so that said spring means propels said knife through said diaphragm, including fluid pressure responsive means coupled to said spring means and cooperable with said periphery contacting element at said predetermined magnitude of pressure to force said spring means from its cocked condition.

2. Safety apparatus for relieving a pressure condition in a fluid pressure system, comprising:
   a body having a cavity to be connected to the pressure in the system;
   a diaphragm forming a wall of said cavity;
   means operative to rupture said diaphragm in the event of imposed pressure thereon in excess of a predetermined magnitude, said rupturing means including
  a knife element having a diaphragm rupturing edge normally disposed in spaced relation to said diaphragm,
  an overcenter Belleville spring means connected to and normally holding said knife in said normally disposed position,
  said knife element being operatively connected to the center of said Belleville spring means for movement therewith,
  said spring means being self-sustaining in the overcenter position,
  means supporting the outer peripheral edge of said spring means and subject to fluid pressure-induced movement in a direction to dislodge said spring means from its self-sustaining position,
  and fluid pressure responsive means operative, in the event of being subjected to pressure of a predetermined magnitude, to cause said spring means to partake of an overcenter motion and propel said knife through said diaphragm.

3. The combination of claim 2, in which said knife element is so shaped as to cut a portion out of the diaphragm to be ruptured thereby, said knife element also including a passage for the cut diaphragm portion and through which pressure is released by diaphragm rupture, said body having an opening to the atmosphere with which said passage is in fluid communication.

4. The combination of claim 2, in which said Belleville spring means has an $h/t$ ratio sufficient to cause it to be self-sustaining when moved overcenter, and in which said fluid pressure responsive means engages the center of said spring means and is operative to dislodge said spring means from said self-sustaining position thereof.

5. The combination of claim 4, including
  means connecting said knife element to the center of said spring means for movement therewith;
  and pressure distensible diaphragm means engaged by said knife connecting means when said spring means is in said overcenter position and is operative by distension deriving from fluid pressure of a predetermined magnitude to dislodge said spring means from its overcenter position.

6. The combination of claim 5, in which said distensible diaphragm means comprises a pair of distensbile diaphragms disposed one on the other; and separate port means affording separate connections of the sides of said diaphragms remote from the spring means with separate sources of pressure, whereby either the one of said diaphragms adjacent to said spring means or both diaphragms as a unit may be employed to move said spring means toward its point of dislodgment from its said self-sustaining position.

7. The combination of claim 2, including an annular fulcrum in said body against which an intermediate of the spring means bears in its overcenter position, and about which the spring means operates in its movement from its self-sustaining position.

8. Safety apparatus for relieving a pressure condition in a fluid pressure system, comprising:
  a body having a cavity to be connected to the pressure in the system;
  a diaphragm forming a wall of said cavity;
  means operative to rupture said diaphragm in the event of imposed pressure thereon in excess of a predetermined magnitude, said rupturing means including
    a knife element having a diaphragm rupturing edge normally disposed in spaced relation to said diaphragm,
    an overcenter spring means connected to and normally holding said knife in said normally disposed position,
    and fluid pressure responsive means operative, in the event of being subjected to pressure of a predetermined magnitude, to cause said spring means to partake of an overcenter motion and propel said knife through said diaphragm;
    and circuit means having an indicator to indicate the operativeness of said safety apparatus while maintaining the integrity of said diaphragm, said circuit means including said spring means and switch means operable thereby, said spring means being capable of movement to operate said switch means without operating said knife element.

References Cited

UNITED STATES PATENTS

| | | | |
|---|---|---|---|
| 1,762,806 | 6/1930 | Allen et al. | 137—68 XR |
| 1,993,697 | 3/1935 | Allen et al. | 137—68 XR |
| 2,355,951 | 8/1944 | Coffeen et al. | |
| 2,708,110 | 5/1955 | Clay. | |
| 3,030,096 | 4/1962 | Davis. | |
| 3,330,440 | 7/1967 | Summers et al. | |

RAPHAEL H. SCHWARTZ, Primary Examiner

U.S. Cl. X.R.

137—68